(12) United States Patent  
Du et al.

(10) Patent No.: US 8,730,663 B2  
(45) Date of Patent: May 20, 2014

(54) ELECTRONIC APPARATUS

(75) Inventors: Sung Nien Du, Taipei (TW); Ting-Chiang Huang, Taipei (TW); Wei-Yi Lin, Tapei (TW); Li-Ting Wang, Taipei (TW)

(73) Assignee: Inventec Corporation, Taipei (TW)

( * ) Notice: Subject to any disclaimer, the term of this patent is extended or adjusted under 35 U.S.C. 154(b) by 177 days.

(21) Appl. No.: 13/352,656

(22) Filed: Jan. 18, 2012

(65) Prior Publication Data

US 2013/0155605 A1 Jun. 20, 2013

(30) Foreign Application Priority Data

Dec. 16, 2011 (TW) .............................. 100146793 A

(51) Int. Cl.  
H05K 5/00 (2006.01)  
H05K 7/00 (2006.01)  
G06F 1/20 (2006.01)  
H05K 7/20 (2006.01)

(52) U.S. Cl.  
USPC ................. 361/679.46; 361/688; 361/679.01; 361/679.48; 361/679.49; 361/679.5; 361/679.51

(58) Field of Classification Search  
USPC .............................. 361/679.46, 688, 679.01, 361/679.48–679.51  
See application file for complete search history.

(56) References Cited

U.S. PATENT DOCUMENTS

2010/0167636 A1\* 7/2010 Bhattacharya et al. ....... 454/239

\* cited by examiner

*Primary Examiner* — Anthony Haughton  
*Assistant Examiner* — Zhengfu Feng  
(74) *Attorney, Agent, or Firm* — WPAT, PC; Justin King

(57) ABSTRACT

An electronic apparatus is disclosed, which comprises: a housing, configured with a plurality of inlets and one outlet; a plurality of electronic elements, disposed inside the housing; and a plurality of gates, arranged at positions corresponding to the plural inlets in an one-by-one manner; wherein, the plural electronic elements are activated while the electronic apparatus is enabled for causing the temperature of the plural electronic elements to be raised to their respective working temperatures, thereby, causing a plurality of heating zones to be formed inside the housing at positions respectively corresponding to the plural inlets; and by enabling each gate to be configured with one thermal expansion element that is enabled to deform with the temperature variation of the corresponding heating zone, each gate is enabled to move between a first position and a second position according to the deformation of the corresponding thermal expansion element.

9 Claims, 7 Drawing Sheets

ELECTRONIC APPARATUS

FIELD OF THE INVENTION

The present invention relates to an electronic apparatus, and more particularly, to an electronic apparatus capable of having its air inlets to be adjusted, i.e. closed or opened, according to different actual heating conditions, and consequently causing the air flow field inside the electronic apparatus to change accordingly for dissipating heat specifically from certain electronic components inside the electronic apparatus that are comparatively hotter than others.

BACKGROUND OF THE INVENTION

For most electronic apparatuses, especially computers, there is generally a lot of heat being generated inside their housings, such as housings for notebooks computers or mainframes. Consequently, for enabling the heat accumulated inside the housing to be dissipated rapidly out of the housing, there are a plurality of heat dissipation holes to be formed on the housing for causing convection between air inside the housing and those outside.

It is noted that the arrangement of such heat dissipation holes is determined mainly according to the distribution of the corresponding heat sources or according to the air flow field that is intended to achieve. After the position of each heat dissipation hole on a housing had been determined, the air flow field inside the housing is settled accordingly that will not be changed by the different ambient environments or by the working habits of different users. In an other word, since there are generally more than one electronic components being arranged inside an electronic apparatus and also as different electronic components that are arranged inside the same electronic apparatus are generally being heated to different temperature, it is important to locate such heat dissipation holes properly on the housing of the electronic apparatus, considering the positioning and temperature variations of different electronic components inside the housing, so as to enable each and every electronic component inside the house to be able to dissipate heat evenly and effectively.

Generally, under different operation modes, the same electronic component inside the electronic apparatus may not be emitting the same amount of heat. However, using those conventional heat dissipation hole arrangements, the air flow field is fixed and can not be changed when the operation mode is changed and also it can not be adapted for dissipating heat specifically from one single heat source. Therefore, in a condition when the temperature of one specific electronic component is raised abruptly, the only way is to increase the rotation speed of the fan for accelerating the overall air flow speed inside the house so as to cool down the specific electronic component. Nevertheless, since the increasing of the rotation speed of the fan can only cause the overall air flow inside the house to accelerate, it ca not be adapted for dissipating heat specifically from the one electronic component whose temperature is raised abruptly.

Although there are already many studies and patents specifically designed for improving heat dissipation efficiency, the means disclosed therein can be concluded to either raise the rotation speed of heat dissipation fan, or increase the amount of air inlets/outlets formed on the housing. Notably, there is never any mention about a structure or method designed for causing the air flow field inside an electronic apparatus to change for dissipating heat specifically from certain electronic components inside the electronic apparatus that are comparatively hotter than others.

Therefore, it is in need of an electronic apparatus capable of having its air inlets to be adjusted, i.e. closed or opened, according to different actual heating conditions, and consequently causing the air flow field inside the electronic apparatus to change for dissipating heat specifically from certain electronic components inside the electronic apparatus that are comparatively hotter than others.

SUMMARY OF THE INVENTION

In view of the disadvantages of prior art, the object of the present invention is to provide an electronic apparatus capable of having its air inlets to be adjusted, i.e. closed or opened, according to different actual heating conditions, and consequently causing the air flow field inside the electronic apparatus to change for dissipating heat specifically from certain electronic components inside the electronic apparatus that are comparatively hotter than others.

To achieve the above object, the present invention provides an electronic apparatus, comprising:
- a housing, configured with a plurality of inlets and one outlet, the inlet being provided for guiding a cooling air to flow into the housing;
- a plurality of electronic elements, disposed inside the housing; and
- a plurality of gates, arranged at positions corresponding to the plural inlets;
- wherein, the plural electronic elements are enabled to achieve their respective working temperatures while being activated, and there are at least two of the plural electronic elements whose working temperatures are not the same; and when the electronic apparatus is enabled, the plural electronic elements are activated for cause the temperatures of the plural electronic elements to be raised to their respective working temperatures, thereby, causing a plurality of heating zones to be formed inside the housing at positions respectively corresponding to the plural inlets in an one-by-one manner while allowing each of the plural heating zones to contains at least one of the plural electronic elements; and each of the plural gates has one thermal expansion element configured thereat while allowing the thermal expansion element to deform with the temperature variation of the corresponding heating zone, and by the deformation of the thermal expansion element according to the temperature variation of the corresponding heating zone, each gate is enabled to move between a first position and a second position according to the deformation of the corresponding thermal expansion element, resulting that the plural inlets are driven accordingly to be opened or closed in a manner that at different time points, the inlets that are opened at one time point may not be the same as those opened at another time point, so as to cause different cooling air flow field inside the housing.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
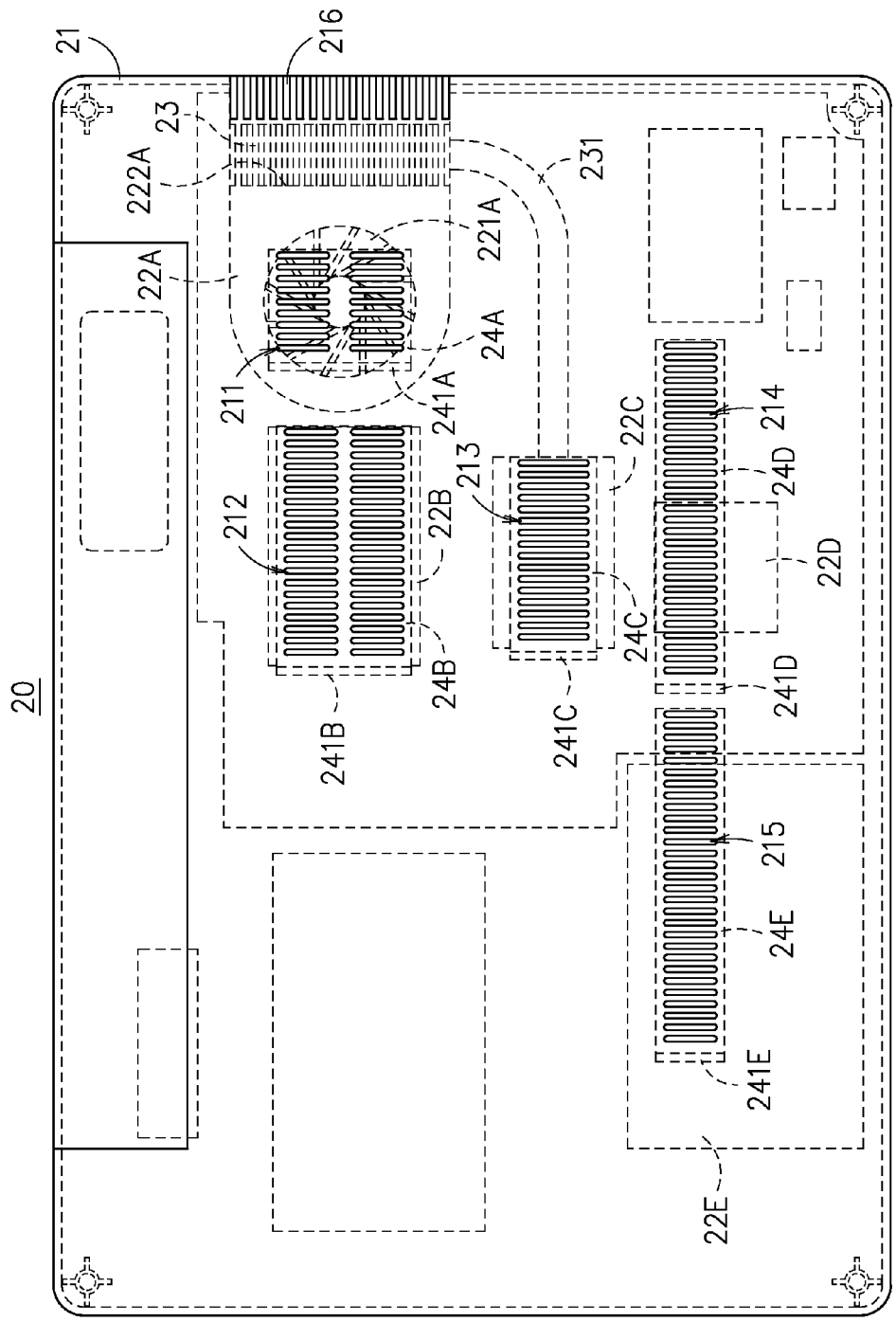
FIG. 1 is a schematic diagram showing an electronic apparatus of the present invention.

Please refer to FIG. 1, which is a schematic diagram showing an electronic apparatus of the present invention. It is noted that the electronic apparatus 50 of the present invention can be an electronic device of any type and shape, whichever is substantially a housing having a plurality of electronic element mounted therein, such as notebook computers or tablet computers. As shown in FIG. 1, the electronic apparatus 20 has a housing 21, that is to be used for a plurality of electronic elements to mounted therein, such as the first electronic element 22A, the second electronic element 22B, the third electronic element 22C, the third electronic element 22D and fifth electronic element 22E shown in this embodiment of FIG. 1. Operationally, the plural electronic elements 22A~22E are enabled to achieve their respective working temperatures while being activated, and there are at least two of the plural electronic elements 22A~22E whose working temperatures are not the same, i.e. different electronic elements can have different working temperatures; and when the electronic apparatus 20 is enabled, the plural electronic elements 22A~22E are activated for cause the temperatures of the plural electronic elements 22A~22E to be raised to their respective working temperatures. It is noted that for different electronic apparatus, the types of the plural electronic elements 22A~22E that are used in the electronic apparatus 20 can be different. For instance, if the electronic apparatus 20 is a notebook computer, the first electronic element 22A can be a fan, such as a centrifugal fan in this embodiment, the second electronic element 22B or the third electronic element 22C can respectively be a device selected from the group consisting of: a double data rate synchronous dynamic random-access memory (DDR SDRAM), a central processing unit (CPU), a video graphic array (VGA) chip, such as the second electronic element 22B can be a DDR SDRAM and the third electronic element 22C can be a CPU; and the fourth electronic element 22D or the fifth electronic element 22E can be a device selected from the group consisting of: random-access memory (RAM), a platform controller hub (PCH), a WLAN interface card, a 3rd generation (3G) interface card, such as the fourth electronic element 22D can be a PCH and the fifth electronic element 22E can be a WLAN interface card.

Among the aforesaid electronic elements, the working temperatures of the DDR SDRAM, the CPU and the VGA chip, which are generally ranged between 40° C. and 50° C., are higher than the working temperatures of the RAM, the PCH, the WLAN interface card and the 3rd generation (3G) interface card, which are generally ranged between 30° C. and 40° C. As for the fan, since it is used for guiding a flow of cooling air into the housing 21, its working temperature is the lowest, which is ranged between 20° C. and 30° C. In addition, as the electronic elements 22A~22E that are operating at different working temperatures are arranged inside the housing 21, there will be a plurality of heating zones to be formed inside the housing 21. Thus, the heat accumulated inside the housing 21 is designed to be dissipated by the cooling air flow induced by the fan that is flowing between the inlet and the outlets of the housing 21.

In the embodiment shown in FIG. 1, the housing 21 is configured with a first inlet 211, a second inlet 212, a third inlet 213, a fourth inlet 214, a fifth inlet 215 and an outlet 216. Since the diagram of FIG. 1 is the bottom view of the housing 21, the first inlet 211, the second inlet 212, the third inlet 213, the fourth inlet 214, the fifth inlet 215 and the outlet 216 are all disposed on the bottom of the electronic apparatus 20. However, the outlet can be extended to a sidewall of the housing 21 as required. In this embodiment, the first, the second, the third, the fourth, and the fifth inlets 211~215, as well as the outlet 216 are respectively formed as an array of a plurality of bar-like first hollow parts, whereas each of the plural first hollow part is formed penetrating through the housing 21. Moreover, the fan 22A is configured with an air intake side 221A and an air outlet side 222A in a manner that the air outlet side 222A is arranged at a position corresponding to the outlet 216 while allowing an intake flow field to be formed between the air intake side 221A, the first inlet 211, the second inlet 212, the third inlet 213, the fourth inlet 214 and the fifth inlet 215. As shown in FIG. 1, there is a heat dissipation fin 23 being disposed at a position corresponding to the air outlet side 222A and also the outlet 216, and also the heat dissipation fin 23 is connected to the third electronic element 22C by a thermal tube 231 that is used for conducting the heat generated from the third electronic element 22C in operation rapidly to the heat dissipation fin 23. In FIG. 1, the second inlet 212 is positioned at a position corresponding to the second electronic element 22B, the third inlet 213 is positioned at a position corresponding to the third electronic element 22C, the fourth inlet 214 is positioned at a position corresponding to the fourth electronic element 22D, and the fifth inlet 215 is positioned at a position corresponding to the fifth electronic element 22E.

It is noted that in perfect condition, the cooling effect can be optimized if the cooling air from an inlet can be guided to blow directly toward an heat-emitting electronic element and for each of the plural heat-emitting electronic elements, there is one inlet to be formed at a position corresponding thereto. However, in reality, considering all kinds of design factors relating to the housing including the outlook, the size and strength requirements, it is difficult to provide enough inlets for each of the electronic elements mounted inside the housing in an one-by-one manner. Therefore, those electronic elements with comparatively higher working temperatures are prioritized. As shown in FIG. 1, the second inlet 212 and the third inlet 213 are arranged at positions corresponding respectively to the second electronic element 22B and the third electronic element 22C, while the fourth inlet 214 and the fifth inlet 215 are not arranged corresponding to the fourth electronic element 22D and the fifth electronic element 22E in an one-by-one manner, but are arranged inside an area that is in communication with a generally larger heating zone. In another word, the first, the second, the third, the fourth and the fifth inlets 211~215 are arranged at positions respectively corresponding to five heating zones in an one-by-one manner, whereas in each of the five heating zones, there can be at least one electronic element to be disposed thereat that is capable of emitting heat while being activated. In addition, the second inlet 212, the third inlet 213, the fourth inlet 214 and the fifth inlet 215 are formed at positions spaced from the first inlet 211 by different distances that are increased sequentially.

Moreover, there are a plurality of gates 24A~24E to be arranged at positions corresponding to the plural inlets 211~215 in respectively, i.e. there is a first gate 24A arranged at a position corresponding to the first inlet 211, there is a second gate 24B arranged at a position corresponding to the second inlet 212, there is a third gate 24C arranged at a position corresponding to the third inlet 213, there is a fourth gate 24D arranged at a position corresponding to the fourth inlet 214, and there is a fifth gate 24E arranged at a position corresponding to the fifth inlet 215. Simultaneously, each of the plural gates 24A~24E has one thermal expansion element 241A~241E configured thereat while allowing each of the plural thermal expansion elements 241A~241E to be designed with a deformation temperature in a manner that as soon as the temperature detected by the thermal expansion element 241A~241E reaches the deformation temperature, the deformation of the thermal expansion element 241A~241E is initiated. In this embodiment, each of the thermal expansion elements 241A~241E is made of a materials exhibiting anisotropic thermal expansion behavior, and is capable of expanding/contracting in a single direction. Operationally, As soon as the thermal expansion elements 241A~241E are induced to deform with the temperature variation of their respective corresponding heating zone, and by the deformation of the thermal expansion elements 241A~241E, the gates, i.e. the first, the second, the third, the fourth and the fifth gates 24A~24E, are enabled to move between their respectively first positions and second positions according to the deformation of the corresponding thermal expansion elements 241A~241E, resulting that the plural inlets, i.e. the first, the second, the third, the fourth and the fifth inlets 211~215, are driven accordingly to be opened or closed.

In this embodiment, at one gate selected from the group consisting of the first gate 24A, the second gate 24B, the third gate 24C, the fourth gate 24D and the fifth gates can be made of a material featured by a first thermal expansion coefficient, while allowing the thermal expansion element corresponding to the selected gate to be formed with a second thermal expansion coefficient that is not equal to the first thermal expansion coefficient. For instance, when the third gate 24C is made of a material featured by a first thermal expansion coefficient, the thermal expansion element 241C that is arranged corresponding to the third gate 24C should be formed with a second thermal expansion coefficient, and thereby, by the difference between the first and the second thermal expansion coefficients, under the same heating condition the amount of heat expansion of third gate 24C is different from that of its corresponding thermal expansion element 241C, and consequently, the third gate 24C is driven to move accordingly for enabling the third inlet 213 to close or open. It is noted that for enabling the inlets to close or open, all it take is to enable the gates 24A~24E and their corresponding thermal expansion elements 241A~241E to be made of different materials of different thermal expansion coefficients, without considering whether or not the amount of heat expansion of the thermal expansion elements are larger than their corresponding gates.

Figure 2:
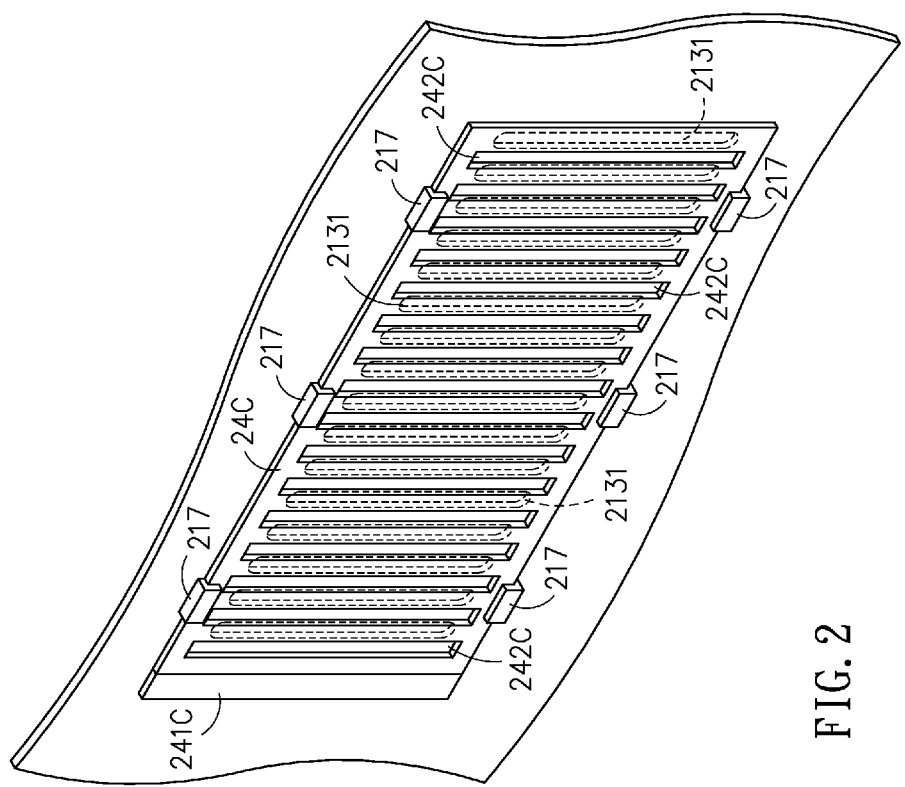
FIG. 2 is a schematic diagram showing an inlet used in the present invention that is closed by a gate.
Figure 3:
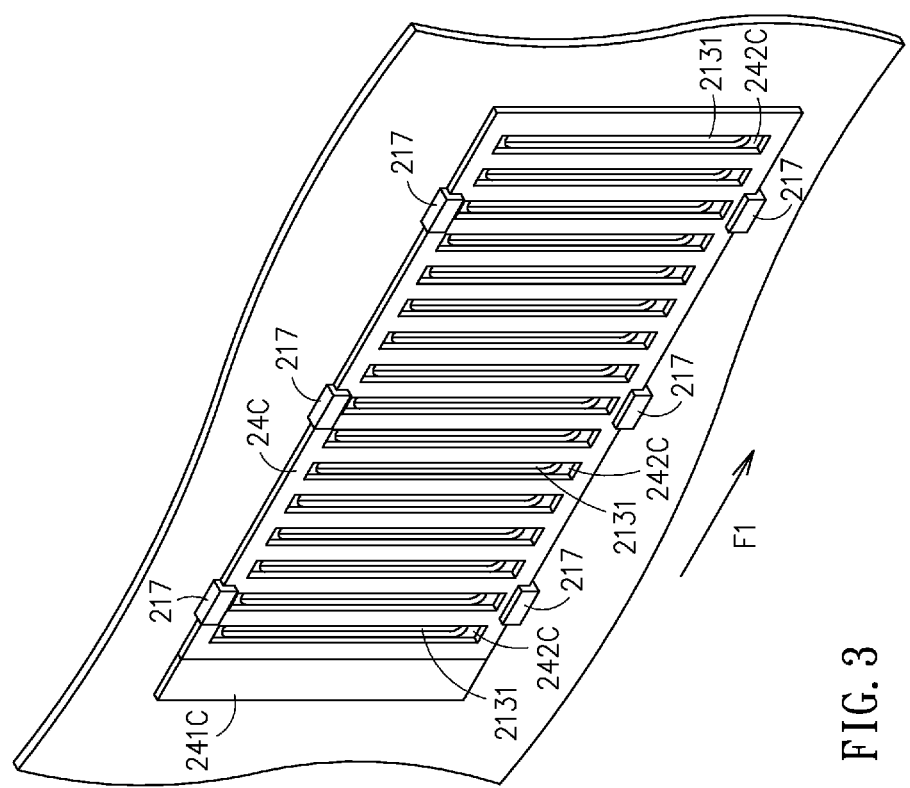
FIG. 3 is a schematic diagram showing an inlet used in the present invention whose gate is opened.

Please refer to FIG. 2 and FIG. 3, which are schematic diagrams showing respectively an inlet used in the present invention that is closed or opened by a gate. In FIG. 2 and FIG. 3, only the third inlet 213 and its corresponding third gate 24C are used for illustration. Although the first, the second, the third, the fourth and the fifth inlets 211~215 can be formed in different shapes and sizes, and similarly the first, the second, the third, the fourth and the fifth gates 24A~24E can also be formed in different shapes and sizes, there are all working exactly as the third inlet 213 and its corresponding third gate 24C that are shown in FIG. 2 and FIG. 3.

As shown in FIG. 2, the third inlet 213 is formed substantially as an array of a plurality of bar-like first hollow parts 2131. In addition, on the inner side of the housing 21, i.e. one the side of the housing 21 that is facing toward the third electronic element 22C, there are a plurality of hook 217 arranged thereat so as to be used for fixing the third gate 24C at a position corresponding to the third inlet 213 while allowing the third gate 24C to move in a direction parallel to a first direction F1. Moreover, there is a thermal expansion element 241C disposed at a side of the third gate 24C that can be deformed by temperature variation. Correspondingly, the third gate 24C is composed of a plurality of second hollow parts 242C. In FIG. 2, the thermal expansion element 241C situated under its normal condition, that is, it is not deformed by temperature variation as the electronic apparatus 20 is not functioning, and therefore, the third gate 24C is positioned at its first position so that the first hollow parts 2131 are disposed in an alternating and offset relationship with respect to the second hollow parts 242C for enabling the third inlet 213 to be closed. That is, when the electronic apparatus 20 is not active, each of the first, the second, the third, the fourth and the fifth electronic elements 22A~22E will not be enabled to generate heat, and thus, the thermal expansion elements 241A~241E will be situated under their respective normal conditions without expanding and consequently the first, the second, the third, the fourth and the fifth inlets 211~215 are closed. On the other hand, as soon as the electronic apparatus 20 is enabled, the third electronic element 22C will be activated accordingly and thus its temperature will be rising gradually through time. Consequently, the heating zone neighboring to the third electronic element 22C is heated, and as soon as the temperature of the heating zone reach the deformation temperature of the thermal expansion element 241C, the expansion deformation of the thermal expansion element 241C is initiated for gradually pushing the third gate 24C toward its second position where the first hollow parts 2131 and the second hollow parts 242C are disposed at positions that correspond to each other for enabling the third inlet 213 to be opened, as shown in FIG. 3. Similarly, as soon as the electronic apparatus 20 is enabled, the first, the second, the third, the fourth and the fifth electronic elements 22A~22C will all be activated accordingly and thus their temperatures will be rising gradually through time to their respective working temperatures. Consequently, the first, the second, the third, the fourth and the fifth gates 24A~24E will be driven to move toward their respective second positions for enabling the corresponding first, second, third, fourth, and fifth inlets 211~215 to open.

It is noted that since the working temperatures of the first, the second, the third, the fourth and the fifth electronic elements 22A~22E can be different from one another, the timing for their respective thermal expansion elements 241A~241E to start deforming can be different. Consequently, the inlets that are opened at one time point will not be the same as those are opened at another time point, that is, the plural inlets are driven to be opened or closed in a manner that at different time points, the inlets that are opened at one time point may not be the same as those opened at another time point, so as to cause different cooling air flow field inside the housing.

Figure 4:
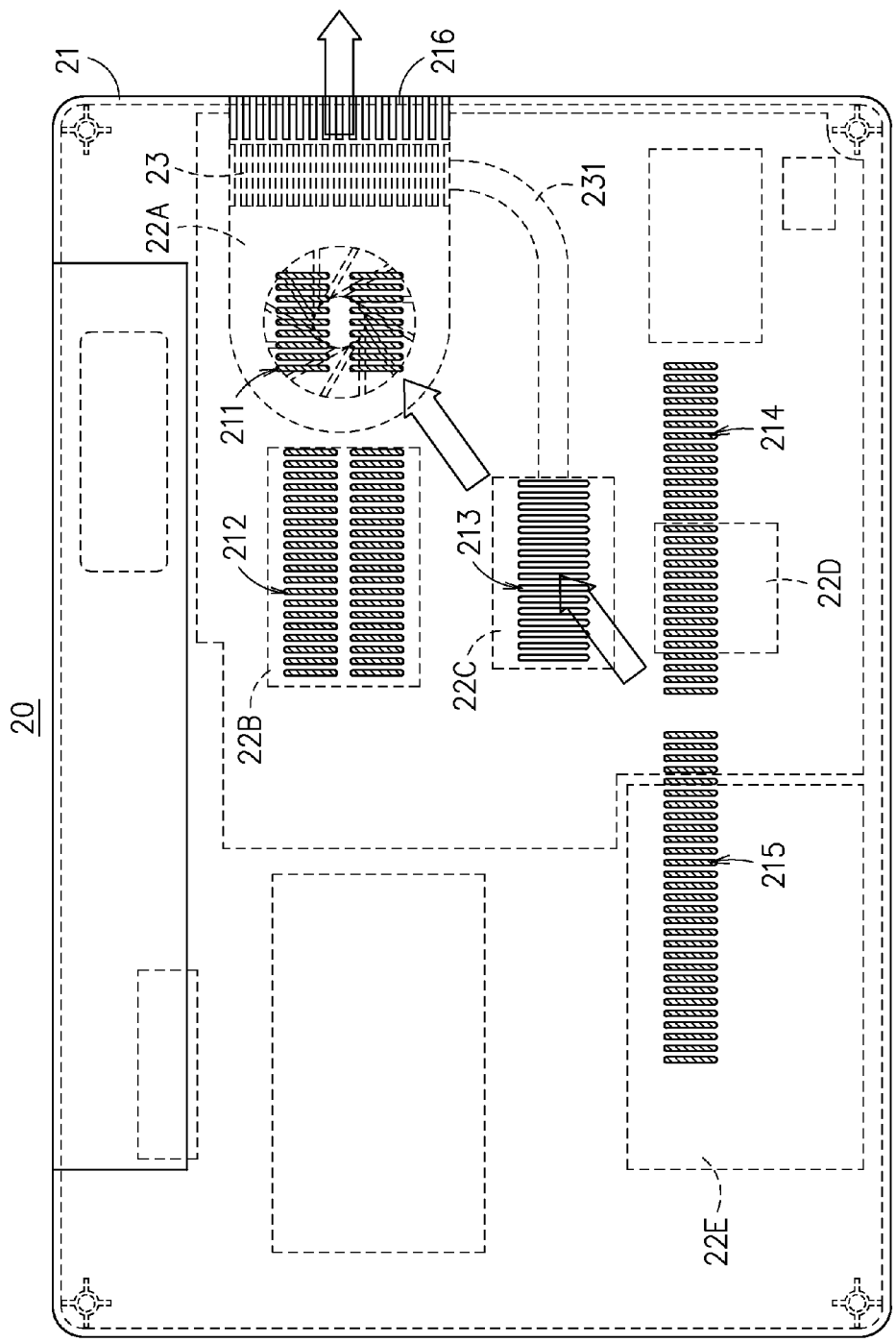
FIG. 4 to FIG. 6 are schematic diagrams showing an electronic apparatus of the present invention that is situated at different time points with different open inlets, and the air flow fields that are generated inside the housing according to the opening of inlets at different time points.

In FIG. 4, the third inlet 213 is open, while the first inlet 211, the second inlet 212, the fourth inlet 214 and the fifth inlet 215 are closed, representing that the temperature of the heating zone relating to where the third electronic element 22C is disposed that is corresponding to the third inlet 213 is high enough and reaches the deformation temperature of the thermal expansion element 241C, while the heat generating from the first electronic element 22A, the second electronic element 22B, the fourth electronic element 22D and the fifth electronic element 22E are not sufficient enough for raising the temperatures of their corresponding heating zones to the deformation temperatures of the thermal expansion elements 241A, 241B, 241E and 241E, that are corresponding respectively to the first inlet 211, the second inlet 212, the fourth inlet 214 and the fifth inlet 215. Therefore, the first inlet 211, the second inlet 212, the fourth inlet 214 and the fifth inlet 215 are closed. Consequently, the fan 22A can draw the cooling air to flow into the housing 21 only through the third inlet 213, while enabling the cooling air to blow directly toward the third electronic element 22C for heat dissipation. By the drawing of the fan 22A, the cooling air can be drawn to flow into the housing 21 continuously, and simultaneously by the suction induced by the operating fan 22A, the cooling air is driven to flow passing the heat dissipation fin 23 through the air outlet side 222A, causing an air flow field to flow in a direction as indicated by the hollow arrows shown in FIG. 4. There can be a portion of heat generated from the third electronic element 22C to be transmitted to the heat dissipation fin 23 through the thermal tube 231, and when the cooling air is driven to blow passing the heat dissipation fin 23, the heat can be dissipated out of the housing 21 of the electronic apparatus 20 through the outlet 216. In this embodiment, since only the third inlet 213 is open, only the heat of the third electronic element 22C is fully dissipated.

Figure 5:
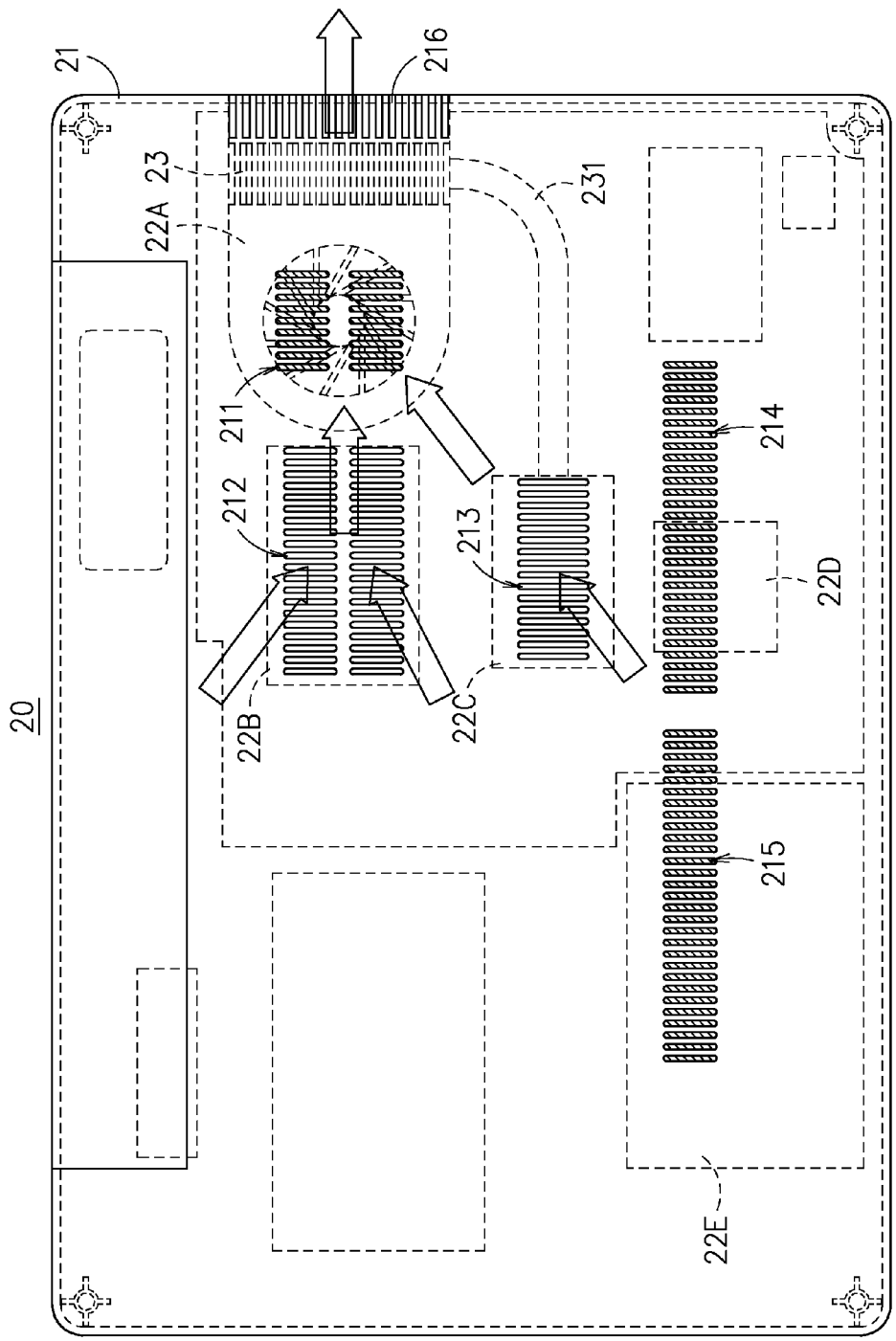

In FIG. 5, the second inlet 212 and the third inlet 213 are open, while the first inlet 211, the fourth inlet 214 and the fifth inlet 215 are closed, representing that the temperatures of the heating zones relating to where the second and the third electronic elements 22B and 22C are disposed that are corresponding to the second inlet 212 and the third inlet 213 are high enough and reach their respective deformation temperatures of the thermal expansion element 241B, 241C, while the heat generating from the first electronic element 22A, the fourth electronic element 22D and the fifth electronic element 22E are not sufficient enough for raising the temperatures of their corresponding heating zones to the deformation temperatures of the thermal expansion elements 241A, 241E and 241E, that are corresponding respectively to the first inlet 211, the fourth inlet 214 and the fifth inlet 215. Therefore, the first inlet 211, the fourth inlet 214 and the fifth inlet 215 are closed. Consequently, the fan 22A can draw the cooling air to flow into the housing 21 only through the second inlet 212 and the third inlet 213, while enabling the cooling air to blow directly toward the second electronic element 22B and the third electronic element 22C for heat dissipation. Thereafter, the cooling air is discharged out of the housing 21 of the electronic apparatus 20 through the outlet 216. It is noted that in this embodiment, the air flow field is induced to flow in a direction as indicated by the hollow arrows shown in FIG. 5.

Figure 6:
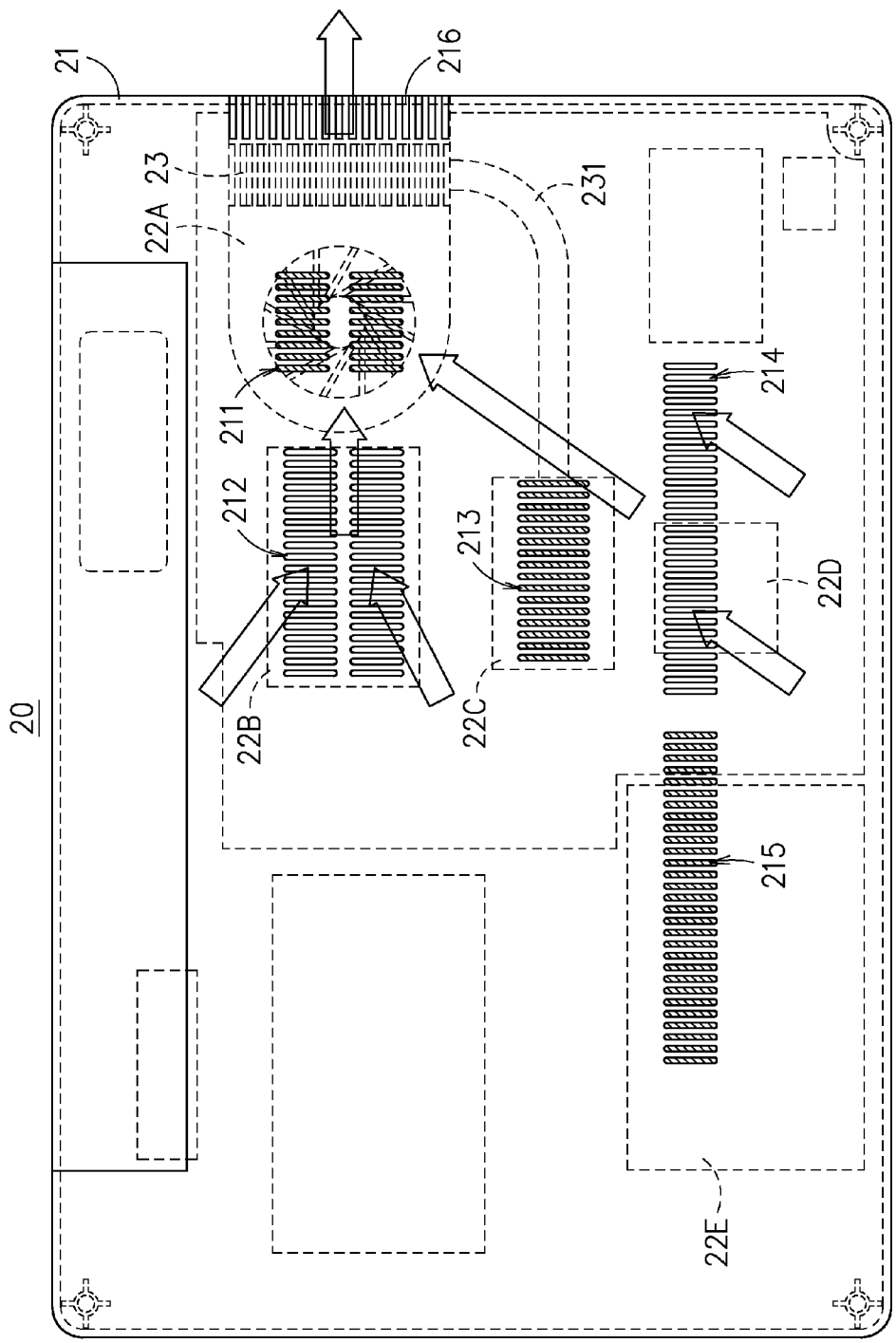

In FIG. 6, the second inlet 212 and the fourth inlet 214 are open, while the first inlet 211, the third inlet 213 and the fifth inlet 215 are closed. Consequently, the fan 22A can draw the cooling air to flow into the housing 21 only through the second inlet 212 and the fourth inlet 214, while enabling the cooling air to blow directly toward the second electronic element 22B and the fourth electronic element 22D for heat dissipation. Thereafter, the cooling air is discharged out of the housing 21 of the electronic apparatus 20 through the outlet 216. It is noted that in this embodiment, the air flow field is induced to flow in a direction as indicated by the hollow arrows shown in FIG. 6.

Figure 7:
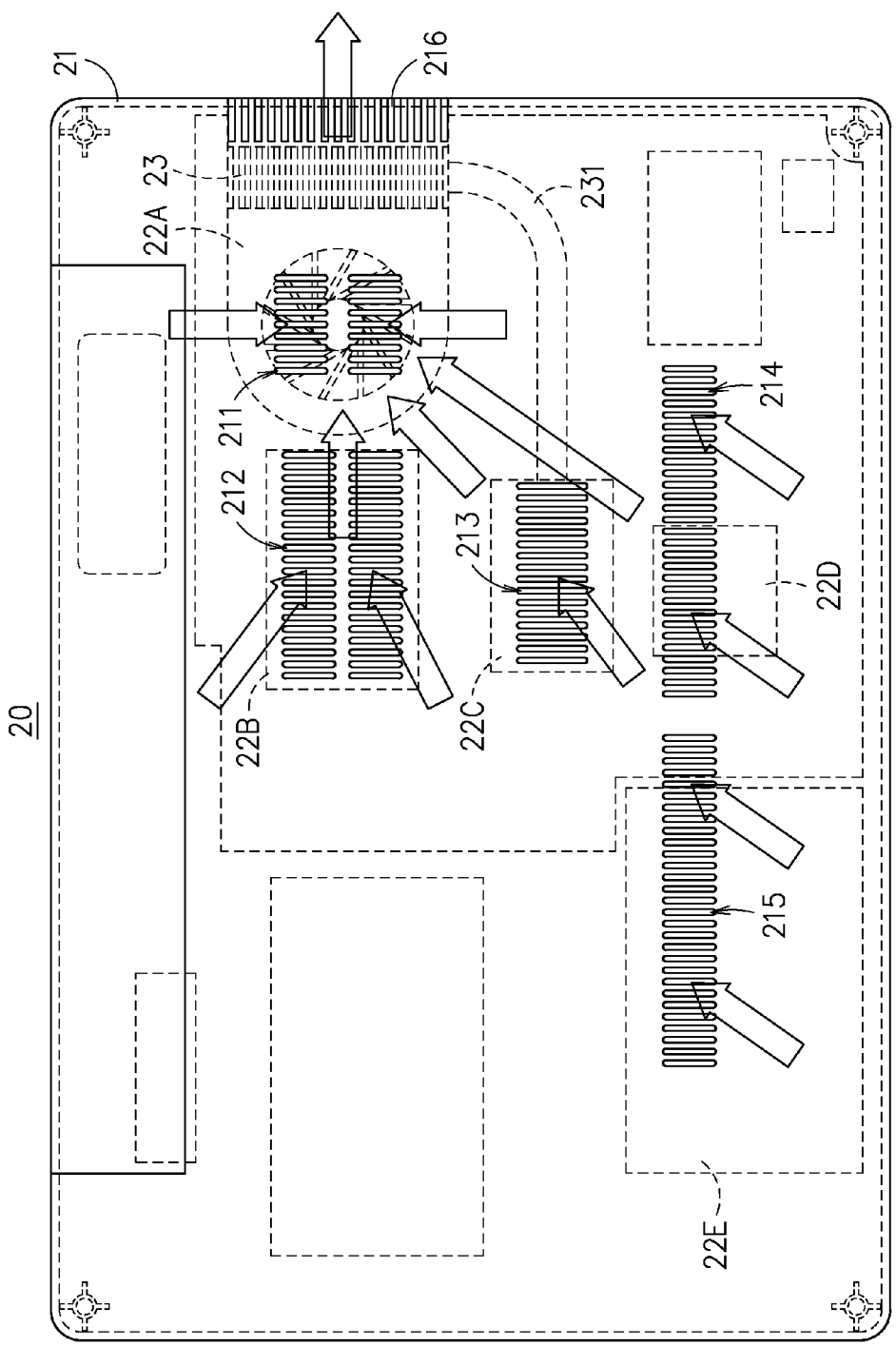
FIG. 7 is a schematic diagram showing an electronic apparatus of the present invention that is situated when all the inlets are opened and the resulting the air flow field.

In FIG. 7, all the first inlet 211, the second inlet 212, the third inlet, the fourth inlet 214 and the fifth inlet 215 are open, representing that the first, the second, the third, the fourth and the fifth electronic elements are all operating at sufficiently high temperatures. Consequently, the fan 22A can draw the cooling air to flow into the housing 21 through the first, the second, the third, the fourth and the fifth inlets 211~215 so as to blow cooling air toward each of those electronic elements 22A~22E for heat dissipation. Thereafter, the cooling air is discharged out of the housing 21 of the electronic apparatus 20 through the outlet 216. It is noted that in this embodiment, the air flow field is induced to flow in a direction as indicated by the hollow arrows shown in FIG. 7.

To sum up, the present invention relates to an electronic apparatus, capable of having its air inlets to be adjusted, i.e. closed or opened, according to different actual heating conditions by the use of their respective gates with thermal expansion elements, and consequently causing the air flow field inside the electronic apparatus to change accordingly for dissipating heat specifically from certain electronic components inside the electronic apparatus that are comparatively hotter than others. Thereby, the amount of cooling air as well as the speed of the cooling air that is induced to flow passing those hot electronic element are increased without having to increase the fan speed. Thus, the heat accumulated inside the aforesaid electronic apparatus can be effectively dissipated as it can provide cooling air to flow specifically passing through the heat sources inside the electronic apparatus.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An electronic apparatus, comprising:
   a housing, configured with a plurality of inlets and one outlet, the inlets being provided for guiding a cooling air to flow into the housing;
   a plurality of electronic elements, disposed inside the housing; and
   a plurality of gates, arranged at positions corresponding to the plural inlets;
   wherein, the plural electronic elements are enabled to achieve their respective working temperatures while being activated, and there are at least two of the plural electronic elements whose working temperatures are not the same; and when the electronic apparatus is enabled, the plural electronic elements are activated for causing the temperatures of the plural electronic elements to be raised to their respective working temperatures, thereby, causing a plurality of heating zones to be formed inside the housing at positions respectively corresponding to the plural inlets in an one-by-one manner while allowing each of the plural heating zones to contains at least one of the plural electronic elements; and each of the plural gates has one thermal expansion element configured thereat while allowing the thermal expansion element to deform with the temperature variation of the corresponding heating zone, and by the deformation of the thermal expansion element according to a temperature variation of the corresponding heating zone, each gate is enabled to move between a first position and a second position according to the deformation of the corresponding thermal expansion element;

wherein each of the thermal expansion elements is made of a material exhibiting anisotropic thermal expansion behavior, and is capable of expanding/contracting in a single direction.

2. The electronic apparatus of claim 1, wherein one of the plural gates is formed with a first thermal expansion coefficient, while allowing the corresponding thermal expansion element to be formed with a second thermal expansion coefficient that is not equal to the first thermal expansion coefficient.

3. The electronic apparatus of claim 1, wherein each of the thermal expansion elements is designed with a deformation temperature in a manner that as soon as the temperature detected by the thermal expansion element reaches the deformation temperature, the deformation of the thermal expansion element is initiated.

4. The electronic apparatus of claim 1, wherein each of the plural inlets is closed when the gates corresponding thereto is moved to the first position; and each of the plural inlets is opened when the gates corresponding thereto is moved to the second position.

5. The electronic apparatus of claim 4, wherein each of the plural inlets is formed substantially as an array of a plurality of first hollow parts, while allowing each hollow area to be formed penetrating the housing, and each of the plural gates that are arranged corresponding to the plural inlet in respective is composed of a plurality of second hollow parts; when one of the plural gates is moved to the first position, the first hollow parts of one inlet corresponding to the aforesaid gate are disposed in an alternating and offset relationship with respect to the second hollow parts of the aforesaid gate for enabling the inlet to be closed; and when the aforesaid gate is moved to the second position, the first hollow parts of the inlet and the second hollow parts of the gate are disposed at positions that correspond to each other for enabling the inlet to be opened.

6. The electronic apparatus of claim 1, wherein there are five inlets being formed on the housing, i.e. a first inlet, a second inlet, a third inlet, a fourth inlet and a fifth inlet; and the housing further comprises: a fan, being configured with an air intake side and an air outlet side in a manner that the air outlet side is arranged at a position corresponding to the outlet while allowing an air flow field to be formed between the air intake side and the air outlet side.

7. The electronic apparatus of claim 6, wherein the second inlet, the third inlet, the fourth inlet and the fifth inlet are formed at positions spaced from the first inlet by different distances that are increased sequentially.

8. The electronic apparatus of claim 6, wherein the working temperatures of the electronic elements that are arranged at the heating zones corresponding respectively to the second inlet and the third inlet are higher than the working temperatures of the electronic elements that are arranged at the heating zones corresponding respectively to the fourth inlet and the fifth inlet.

9. The electronic apparatus of claim 8, wherein each of the electronic elements that are arranged at the heating zones corresponding respectively to the second inlet and the third inlet is a device selected from the group consisting of: a double data rate synchronous dynamic random-access memory (DDR SDRAM), a central processing unit (CPU), a video graphic array (VGA) chip; and each of the electronic elements that are arranged at the heating zones corresponding respectively to the fourth inlet and the fifth inlet is a device selected from the group consisting of: random-access memory (RAM), a platform controller hub (PCH), a WLAN interface card, a 3rd generation (3G) interface card.

* * * * *